United States Patent [19]
Andrea

[11] Patent Number: 5,602,546
[45] Date of Patent: Feb. 11, 1997

[54] METHOD AND APPARATUS FOR THE RAPID TESTING AND ELIMINATION OF HYPOTHESIS CODE SEQUENCES

[75] Inventor: Ralph W. Andrea, Sunnyvale, Calif.

[73] Assignee: GTE Government Systems Corporation, Mountain View, Calif.

[21] Appl. No.: 357,793

[22] Filed: Dec. 15, 1994

[51] Int. Cl.$^6$ .................................................. H03M 7/00
[52] U.S. Cl. .................................................. 341/51; 341/94
[58] Field of Search .............................. 341/51, 94, 106, 341/107, 55; 381/43

[56] References Cited

U.S. PATENT DOCUMENTS 3,953,674  4/1976  Fletcher et al. .
5,040,214  8/1991  Grossberg et al. ........................ 381/43

OTHER PUBLICATIONS

R. B. Ward & K. P. Yiu, "Acquisition of Pseudonoise Signals by Recursion . . . Estimation," IEEE Trans. on Communications, V. COM–25, No. 1, pp. 784–794 (Aug. 1977).

J. L. Massey, "Shift–Register Synthesis and BHC Decoding," IEEE Trans. on Information Theory, vol. IT–15, No. 1, pp. 122–127 (Jan. 1969).

*Primary Examiner*—Brian K. Young
*Attorney, Agent, or Firm*—J. J. Cannon, Jr.; J. S. Yeo

[57] ABSTRACT

An observed binary code sequence which has been corrupted by noise is operated upon to determine the configuration of a code generator capable of generating an equivalent code sequence. A method and apparatus is introduced to determine the code generator configuration based on rapid testing and elimination of a large set of hypothesis code generator configurations.

14 Claims, 3 Drawing Sheets

Fig 1 - Prior Art

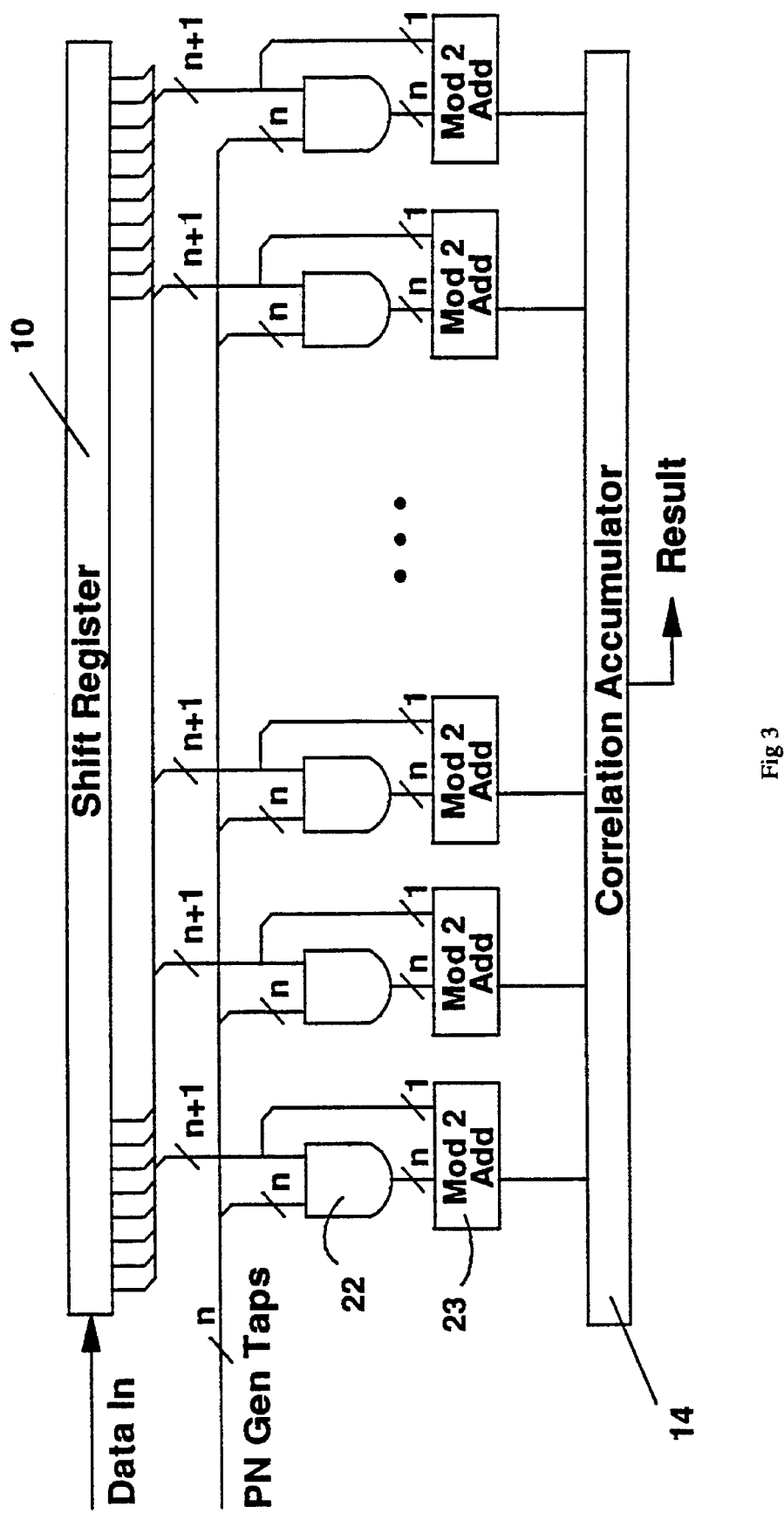

METHOD AND APPARATUS FOR THE RAPID TESTING AND ELIMINATION OF HYPOTHESIS CODE SEQUENCES

BACKGROUND OF THE INVENTION

1. Field of the Invention

This invention relates to the identification of the proper feedback tap configuration which defines a binary pseudonoise (PN) code sequence generator capable of recreating an observed code sequence. The proper feedback tap configuration identification is based on the rapid testing and elimination of hypothesis tap configurations. This invention provides a method and apparatus to rapidly test a large number of code hypothesis, even though the observed code sequence is corrupted by noise.

2. Description of Prior Art

In the paper "Acquisition of Pseudonoise Signals by Recursion Aided Sequential Estimation," by R. B. Ward and K. P. Yiu, *IEEE Transactions on Communications*, Vol. COM-25, No. 1, August 1977, the authors present a technique for the acquisition of a known direct sequence spread spectrum (DSSS) signal based on sequential estimation. The PN code generator uses an arrangement similar to that used for the discrepancy detection logic circuit presented by James L. Massey in his paper "Shift-Register Synthesis and BCH Decoding," *IEEE Transactions on Information Theory*, Vol. IT-15, No. 1, January 1969, with the addition of an integrator to average the value of the discrepancy bit over time. In the prior art of James C. Fletcher (U.S. Pat. No. 3,953,674), he extended the technique of Ward and Yiu to include non-NRZ format signals. Here the integrator was implemented using an 11-bit counter. In the present invention, the discrepancy detection logic circuit of Massey has been extended to include a discrepancy integrator, and further extended to the simultaneous parallel processing of previously stored time samples. Thus, the time integration is performed instantaneously, allowing the hypothesis testing of a large set of code sequences in a timely manner.

SUMMARY OF THE INVENTION

In a first aspect of the invention, an apparatus for the rapid testing and elimination of hypothesis code sequences is provided by utilizing an input shift register for providing storage of the input binary code sequence, a feedback tap means for providing input of the hypothesis feedback tap configuration, a plurality of state correlators each separately providing a discrepancy output indicating the successful or unsuccessful prediction of the next bit in the input binary code sequence, and a correlation accumulator means for the purpose of counting the plurality of discrepancy outputs from the plurality of state correlator means. Each of the plurality of state correlators operates on a small segment of the input sequence and predicts the next bit in the sequence. If the next bit is successfully predicted, an appropriate signal is sent to the correlation accumulator which counts the number of successful predictions form the output of the plurality of state correlators. If the hypothesis feedback tap configuration is correct, the output of the correlation accumulator will approach either k or 0 for a k-stage system. If not, the output will approach k/2.

In a further aspect of the invention, each of the plurality of state correlators is provided by utilizing a shift register means for providing storage of a segment of the input binary code sequence equal in length to the correlation size plus one additional stage for the purpose of storing the next bit in the input sequence, a feedback logic means for providing the selection of shift register stages that match the non-zero bits in the hypothesis feedback tap configuration, and a modulo-2 addition means form the purpose of computing the discrepancy bit by modulo-2 adding the selected shift register stages and the next bit in the input sequence.

In a further aspect of the invention, said correlation accumulator means is provided utilizing a pipelined addition circuit.

In another aspect of the invention, said apparatus for the rapid testing and elimination of hypothesis code sequences is embodied utilizing equivalent analog functions having a direct parallel to those utilized in the preferred embodiment.

BRIEF DESCRIPTION OF THE DRAWINGS

FIG. 3 is the functional block diagram of the preferred embodiment of the rapid hypothesis code elimination apparatus.

DETAILED DESCRIPTION OF THE PREFERRED EMBODIMENT

Figure 1:
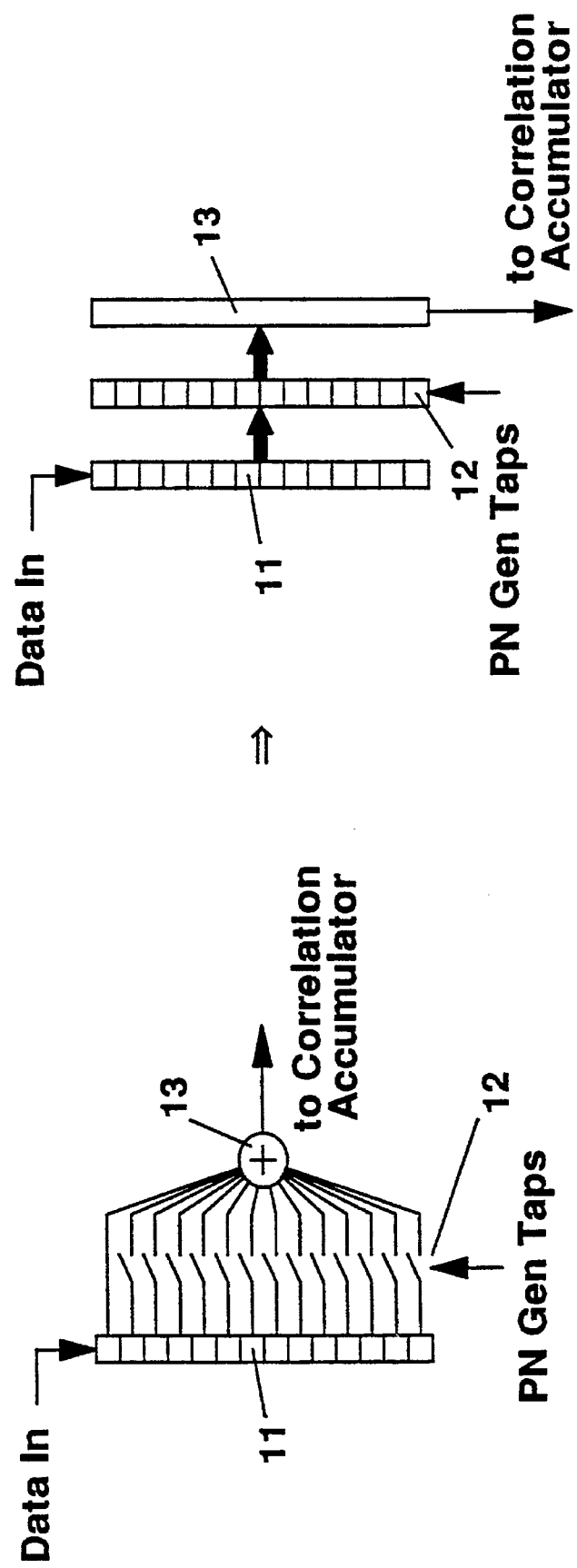
FIG. 1 is the correlator for computation of the correlation prediction discrepancy shown in schematic form and identically in block diagram form. This prior art figure depicts the discrepancy computation correlator described in the paper "Shift-Register Synthesis and BCH Decoding," by James L. Massey, *IEEE Transactions on Information Theory*, Vol. IT-15, No. 1, January 1969.

Linear binary pseudo-noise (PN) code sequences can be generated using a linear feedback shift register (LFSR). The LFSR applies known feedback logic to the current state of the shift register to compute the next bit in the binary code sequence. The next shift register state is produced by feeding the newly computed bit back into the shift register while shifting the previous state to the left (lsb to msb). Hypothesis testing of linear PN sequences may be performed by breaking the feedback connection between the new bit computation and the shift register. When a code sequence is applied to the shift register, the feedback logic should predict the next bit in the sequence. The discrepancy bit is computed by adding the predicted next bit to the actual next bit (modulo-2). An implementation of such a state correlator as described by Massey is shown in the left side of FIG. 1. The state correlator of FIG. 1 is comprised of a shift register 11 with one extra stage to hold the next bit in the input sequence, the feedback taps 12 shown as a set of switches but usually implemented with AND gates, and the modulo-2 adder 13 which adds selected bits from the shift register state and the actual next bit to produce the discrepancy bit. Time integration of the discrepancy bit provides the processing gain necessary to make the code hypothesis tester tolerant of bit errors in the PN code sequence. The state correlator arrangement of FIG. 1 and time integration of its output are described in technical articles including "Acquisition of Pseudonoise Signals by Recursion Aided Sequential Estimation," by R. B. Ward, *IEEE Transactions on Communications*, Vol. COM-13, December 1965.

The state correlator of FIG. 1 is shown in schematic form and identically in a conceptual block diagram form. In the two forms of representation, identical elements have been given identical figure numbers. These include the shift register 11 with one additional stage for the next sequence bit, the feedback taps 12, and the modulo-2 adder 13.

Figure 2:
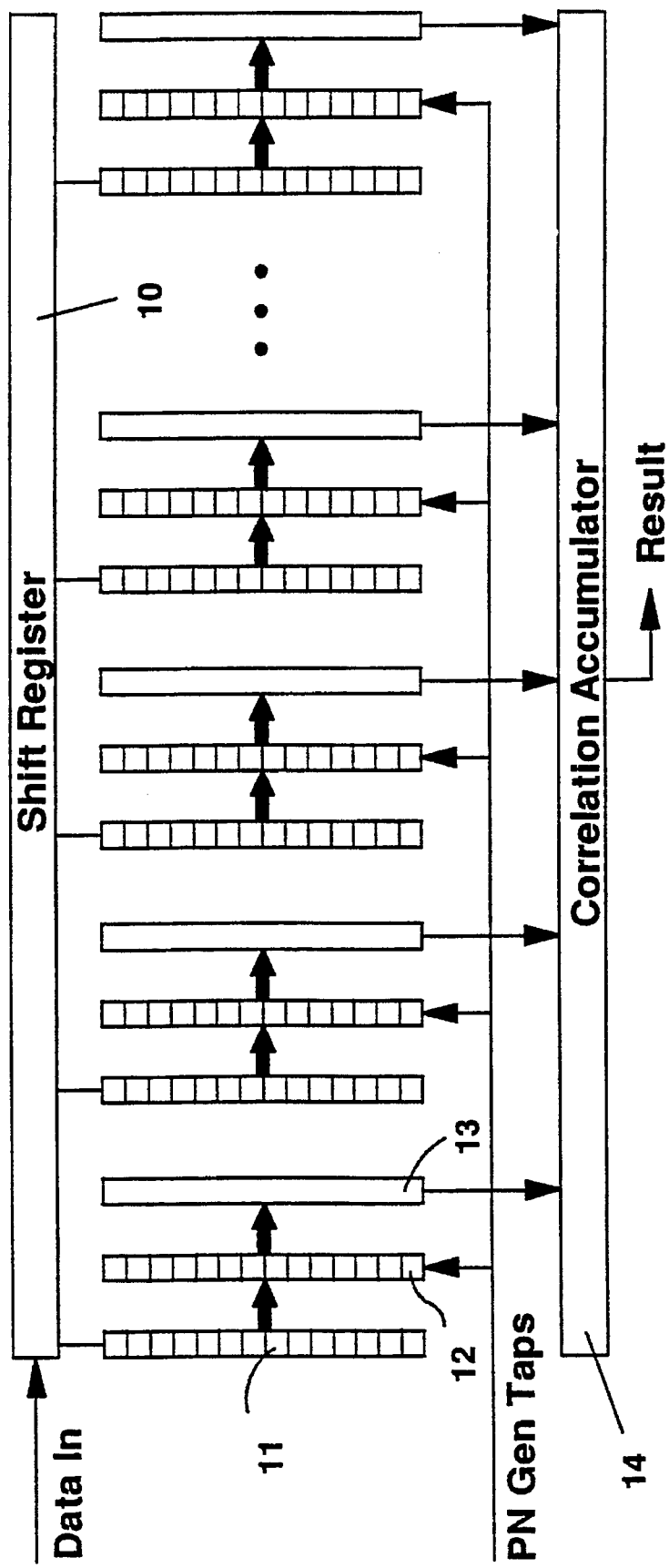
FIG. 2 is the conceptual functional block diagram of the rapid hypothesis code elimination apparatus.

The present invention presents a method and an apparatus for the simultaneous computation of the time integrated discrepancy bit utilizing an efficient parallel architecture. Conceptually, the RHCE consists of an input shift register 10; a large number of state correlators 11–13 (possibly 512 or 1024); and a correlation accumulator 14, as shown in FIG. 2. The input shift register 11 accepts an unknown linear pseudonoise (PN) sequence which may be corrupted with noise. The input sequence is distributed to each of the state correlators 11–13 at a progressively increasing time shift such that each state correlator 11–13 operates on a different subsequence from the input shift register 10. For each state correlator 11–13 if the next data bit is successfully predicted, the correlator will output a '0'; if not, a '1'. The correlation accumulator 14 counts the number of 0's and outputs the result.

For a system having k state correlators 11–13, the result from the correlation accumulator 14 will be approximately k/2 for random data, k for the correct error free PN sequence, and 0 for the inverted correct error free PN sequence. Thus, to obtain the degree of correlation 0, subtract k/2 from the correlation accumulator output and take the absolute value. This will yield 0 for random data, i.e. no correlation, and k/2 for full correlation. The degree of correlation θ(m,s) for PN sequence s, with maximum register length n, and code m is $$\theta(m,s) = \left| \left[ \sum_{j=0}^{k-1} \left[ 1 \oplus s_{j+n} \oplus \sum_{i=0}^{n-1} s_{j+i} \cdot C_{m,i}(\mathrm{mod}\ 2) \right] \right] - \frac{k}{2} \right|$$

Although conceptually valid, a literal implementation of the present invention as shown in FIG. 2 would be quite inefficient. There exists a great deal of computational redundancy which can be eliminated. First, we note that the shift registers 11 in adjacent state correlators 11–13 contain the same information only shifted by one bit. In fact, by extending the input shift register 10 by n bits, the individual state correlator shift registers 11 can be eliminated all together. The second state correlator stage 12 is merely a holding place for the PN generator taps and is completely redundant among all the state correlators. These too are eliminated. The resulting implementable architecture is the preferred embodiment of the present invention and is depicted in FIG. 3.

The architecture of the preferred embodiment of the present invention FIG. 3 is readily implemented in hardware using gate array or programmable logic array technology. The feedback tap logic 12 is implemented utilizing binary AND gates 22. When the modulo-2 adders 23 (parity trees) and the correlation accumulator 14 are pipelined, the hypothesis tester will produce a new result each clock cycle. Code elimination rates of 50–100 million codes per second are achievable with readily available programmable logic devices. There are two caveats to the method of the present invention:

1. The input data sequence must already be digitized. Although this technique can be extended to IF or analog signals, i.e. C cos(ω_c t) where C={−1,+1}, the complexity of the multipliers which must retain at least 4 bits of accuracy will limit the number of stages and; consequently, the achievable processing gain. A potential analog solution is to integrate simple multipliers with an analog ACT, SAW or CCD shift register.

2. The input data is subject to error multiplication. When an input data bit is in error, it will cause one error in the state correlator 11–13 output for each non-zero feedback tap.

In situations where this technique is applicable, it provides an extremely fast and efficient mechanism for detecting code sequences.

What is claimed is:

1. An apparatus for the rapid testing and elimination of hypothesis code sequences, comprising in combination:

input register means for providing storage of the input binary code sequence;

feedback tap means for providing input of the hypothesis code sequences;

a plurality of state correlator means coupled to the input register means, and to the feedback tap means, and each separately providing a discrepancy output indicating the successful or unsuccessful prediction of the next bit in the input binary code sequence; and correlation accumulator means for the purpose of counting the plurality of discrepancy outputs from the plurality of state correlator means.

2. The apparatus for the rapid testing and elimination of hypothesis code sequences of claim 1 wherein said input register means is a binary shift register which is clocked at the input data rate until the shift register is completely full.

3. The apparatus for the rapid testing and elimination of hypothesis code sequences of claim 1 wherein said feedback tap means is coupled to the said feedback logic means utilizing binary AND logic.

4. The apparatus for the rapid testing and elimination of hypothesis code sequences of claim 1 further including feedback tap register means for providing storage of the hypothesis code sequences.

5. The apparatus for the rapid testing and elimination of hypothesis code sequences of claim 1 wherein said state correlator means inputs a segment from the said input register means and the hypothesis code sequences from the said feedback tap means, and comprises in combination:

shift register means for providing storage of a segment of the input binary code sequence equal in length to the correlation size plus one additional stage for the purpose of storing the next bit in the input sequence;

feedback logic means for providing the selection of shift register stages that match the non-zero bits in the hypothesis code sequences; and modulo-2 addition means for the purpose of computing the discrepancy bit by modulo-2 adding the selected shift register stages and the next bit in the input sequence.

6. The apparatus for the rapid testing and elimination of hypothesis code sequences of claim 1 wherein said correlation accumulator means is a pipelined addition circuit.

7. An apparatus for the rapid testing and elimination of hypothesis code sequences, comprising in combination:

input register mean for providing analog storage of an analog input signal containing the binary code sequence;

feedback tap means for providing input of the hypothesis code sequences;

a plurality of state correlator means coupled to the input register means, and to the feedback tap means, and each separately providing a discrepancy output indicating the successful or unsuccessful prediction of the next bit in the input binary code sequence; and a correlation accumulator means for the purpose of counting the plurality of discrepancy outputs from the plurality of state correlator means.

8. The apparatus for the rapid testing and elimination of hypothesis code sequences of claim 7 wherein said input register means is an analog shift register which is clocked at the input data rate until the shift register is completely full.

9. The apparatus for the rapid testing and elimination of hypothesis code sequences of claim 7 wherein said input register means comprises in combination:

analog-to-digital conversion means for the purpose of converting the input analog signal to a sequence of digital words sampled at the underlying code sequence rate; and digital shift register means which is clocked at the underlying code sequence rate until the shift register is completely full.

10. The apparatus for the rapid testing and elimination of hypothesis code sequences of claim 7 wherein said feedback tap means is coupled to the said feedback logic means utilizing an electronic switching device.

11. The apparatus for the rapid testing and elimination of hypothesis code sequences of claim 7 further including feedback tap register means for providing storage of the hypothesis code sequences.

12. The apparatus for the rapid testing and elimination of hypothesis code sequences of claim 7 wherein said state correlator means inputs a segment from the said input register means and the hypothesis code sequences from the said feedback tap means, and comprises in combination:

shift register means for providing storage of a segment of the input binary code sequence equal in length to the correlation size plus one additional stage for the purpose of storing the next bit in the input sequence;

feedback logic means for providing the selection of shift register stages that match the non-zero bits in the hypothesis feedback tap configuration; and four quadrant multiplication means for the purpose of computing the discrepancy bit by multiplying each of the selected shift register stages and the next sample in the input sequence.

13. The apparatus for the rapid testing and elimination of hypothesis code sequences of claim 7 wherein said correlation accumulator means is a pipelined addition circuit.

14. A method for the rapid testing and elimination of hypothesis code sequences, said method comprising the steps of:

providing and storing an input binary code sequence;

providing hypothesis code sequences;

correlating a plurality of segments of the input binary code sequence utilizing said hypothesis feedback tap configuration;

coupling a plurality of state correlator means to the input register means, and to the feedback tap means, and separately providing a discrepancy output indicating the successful or unsuccessful prediction of the next bit in the input binary code sequence; and producing a correlation accumulation for the purpose of counting the plurality of discrepancy outputs from the plurality of state correlator means.

\* \* \* \* \*